United States Patent [19]
Danahey

[11] 3,968,474
[45] July 6, 1976

[54] ALARM SYSTEM HAVING DELAY CHARACTERISTIC
[76] Inventor: David W. Danahey, 128 E. Neshannock Ave., New Wilmington, Pa. 16142
[22] Filed: July 3, 1974
[21] Appl. No.: 485,329

[52] U.S. Cl. .............................. 340/63; 307/10 AT; 340/274 R
[51] Int. Cl.² ................... B60R 25/10; G08B 19/00
[58] Field of Search ............ 340/64, 63, 274, 309.1; 307/10 AT; 180/114

[56] References Cited
UNITED STATES PATENTS

| | | | |
|---|---|---|---|
| 2,984,820 | 5/1961 | Kennell | 340/63 |
| 3,634,846 | 1/1972 | Fogiel | 340/274 |
| 3,643,214 | 2/1972 | Chan | 340/64 |
| 3,649,962 | 3/1972 | Bedard et al. | 340/64 |
| 3,748,494 | 7/1973 | Nine | 340/63 |

Primary Examiner—John W. Caldwell
Assistant Examiner—Joseph E. Nowicki
Attorney, Agent, or Firm—Donn J. Smith

[57] ABSTRACT

An alarm system indicates unauthorized use or entry of a facility having an access arrangement and a source of electric potential. The alarm system comprises an alarm device and a first sensing circuit coupled in series with the alarm device and the potential source. The first sensing circuit is sensitive to breaking or entering or other unauthorized use of the access arrangement. A delay circuit is coupled in series with the alarm device and the potential source. The delay circuit normally completes a circuit path therethrough between the alarm device and the potential source but is effective when triggered to interrupt this circuit path for a predetermined interval sufficient to permit authorized entry or use of the access arrangement. A second sensing circuit is provided for triggering the delay circuit and for establishing an alternate circuit path between the alarm device and the potential source in bypassing relation to the first circuit so that the alarm device is activated at the end of the predetermined interval.

14 Claims, 2 Drawing Figures

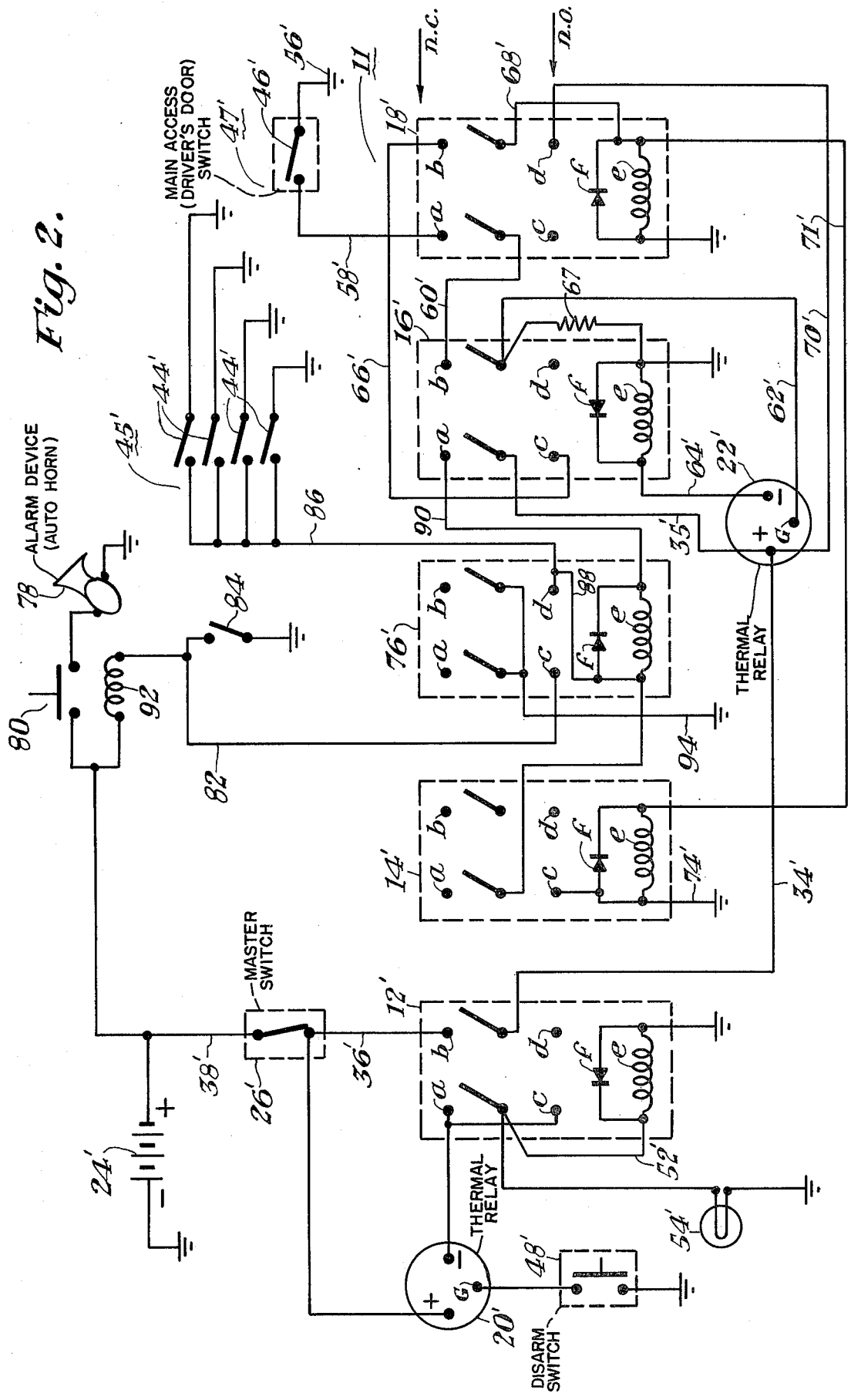

ALARM SYSTEM HAVING DELAY CHARACTERISTIC

The present invention relates to protective alarm circuits with delay characteristics, and more particularly to circuits of the character described for vehicular usage. More particularly, the invention relates to alarm systems wherein automatic delay circuits afford predetermined entry and exit times for the operator and passengers of the vehicle, or for the personnel of a given stationary facility.

Although the invention is described primarily in its application to automotive and other vehicles, it will be apparent as this description proceeds that the alarm systems of the invention are applicable to private dwellings, apartment houses, storerooms, shopping centers, offices, warehouses and other stationary facilities. Considerable interest in alarm systems for many and varied applications is now evident in view of geometric increases in crime rates within the past few years.

Various types of vehicle and other alarm systems have been proposed frequently in the past. Although some of these systems have found limited usage for vehicle applications, the vast proportion of these proposals have been dismissed or discontinued for one important practical reason or another. In many cases prior alarm systems have incorporated exterior locks the are subject to picking or other tampering for deactivation of the alarm system. The complexity of many of these systems has approached the extent that manufacturing, installation and maintenance incentives are subject ot human error as a switch must be thrown or a lock turned by an occupant when leaving the vehicle or other facility. Many prior alarm systems subject the vehicle's electric system to a minor but significant battery drain such that the vehicle cannot be left unattended for extended periods.

In contrast, the alarm systems provided by the invention are relatively uncomplicated for ready manufacture, installation and maintenance. As these alarm circuits require no power in a standby or armed condition, i.e., until the circuit is tripped or energized, the alarm circuit can be left in an activated condition 100% of the time. The inevitable human failings in forgetting to activate the alarm circuit upon leaving the vehicle or other facility, to inactivate the circuit upon entering are thereby eliminated. My novel alarm circuit requires no outside locks or switches that can be picked or otherwise tampered with. In those cases where the alarm system of the invention can be deactivated intentionally, a warning signal is provided.

I accomplish these desirable and unexpected results and overcome the disadvantages of the prior art in a unique fashion by providing an alarm system for indicating unauthurized use or entry of a facility protected thereby and having access means and a source of electric potential, said alarm system comprising an alarm device, a first sensing circuit coupled in series with said alarm device and said potential source, said first sensing circuit being sensitive to breaking or entering or other unauthorized use of at least one of said access means, a delay circuit coupled in series with said alarm device and said potential source, said delay circuit normally completing a circuit path therethrough between said alarm device and said potential source but being effective when triggered to interrupt said circuit path for a predetermined interval sufficient to permit authorized entry or use of said access means, and a second sensing circuit for triggering said delay circuit and for establishing an alternate circuit path between said alarm device and said potential source in bypassing relation to said first sensing circuit so that said alarm device is activated at the end of said predetermined interval.

I also desirably provide a similar alarm system including an electrically latching circuit coupled to said delay circuit and said second sensing circuit for establishing and maintaining a circuit path between said alarm device and said potential source upon any termination of use of said access means and deactivation of said second sensing circuit.

I also desirably provide a similar alarm system wherein said facility is a vehicle and said alarm device includes the vehicle horn, said first sensing circuit includes a plurality of normally closed switches coupled to doors, windows, hood or trunk of said vehicle.

I also desirably provide a similar alarm system including an additional delay circuit coupled between said source and said first-mentioned delay circuit, said additional delay circuit normally completing a circuit path between said first-mentioned delay circuit and said source but being effective when triggered to interrupt the circuit path therethrough for a second predetermined interval sufficient for egress of personnel in said facility through said access means without energizing said alarm means.

I also desirably provide a similar alarm system including manually actuatable circuit means for triggering said additional delay circuit.

I also desirably provide a similar alarm system including a warning indicator coupled to said additional delay circuit and to said alarm circuit for energization thereby but only during said second predetermined interval.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 2 is a similar diagram of another form of my novel alarm system arranged for energizing the horn of a motor vehicle.

Figure 1:
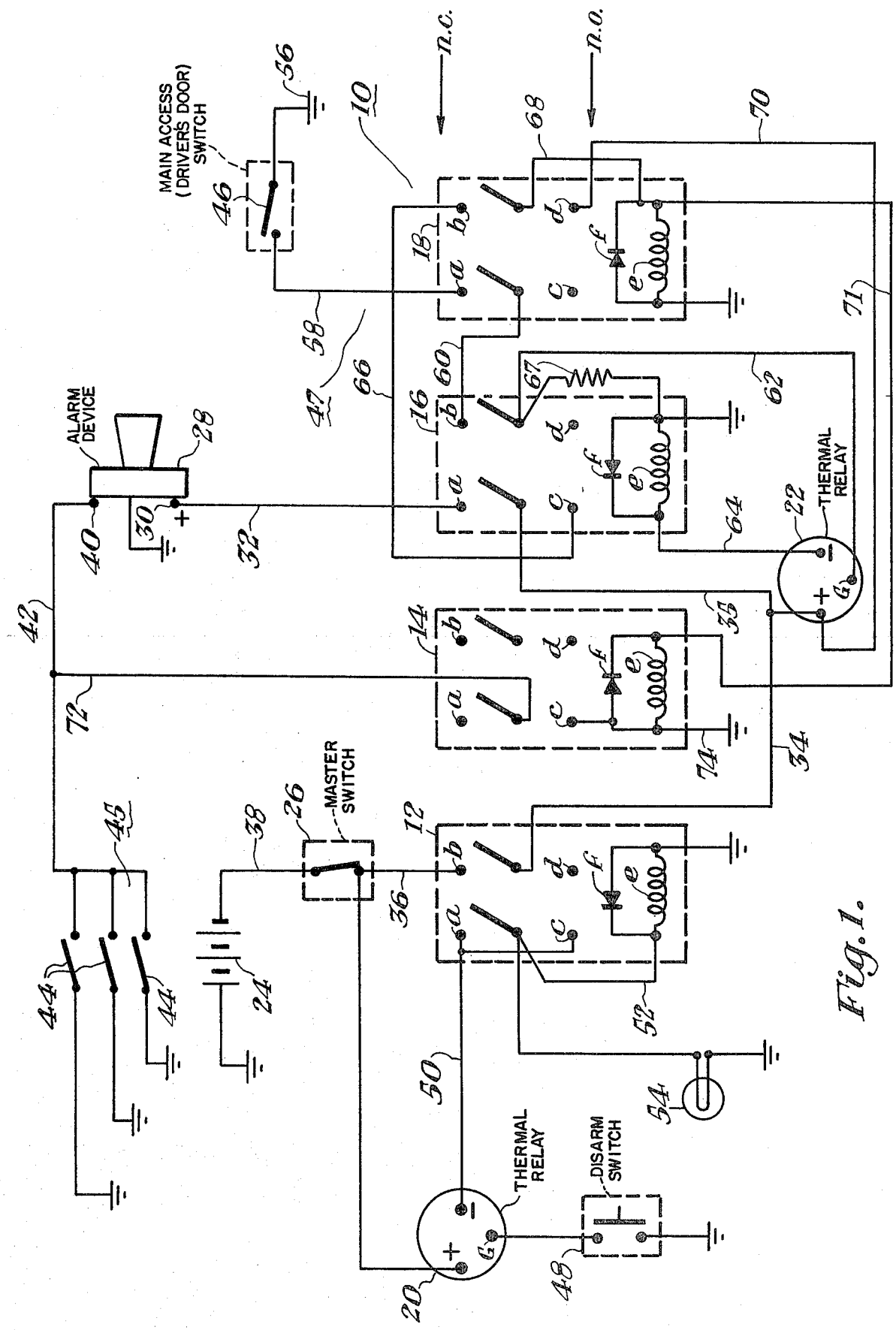
FIG. 1 is a schematic circuit diagram of one arrangement of my novel alarm system for use with a siren or other alarm device having an internal grounding relay.

With particular reference now to FIG. 1, the alarm circuit 10 includes, in this example, a number of dpdt relays 12, 14, 16, 18, and a pair of thermal time delay relays 20, 22. The circuit 10 is energized from a vehicle battery 24 or other source of operating potential, to which it is connected through master switch 26.

In this example the alarm circuit 10 is coupled for actuating, when tripped, a siren 28 or other alarm device preferably having an internal relay. Naturally, if a given alarm device is not so provided, an external relay (not shown in FIG. 1) can be provided after the manner of FIG. 2.

The relays 12–18, in the interests of manufacturing uniformity, are illustrated as dpdt relays, although an spst relay (not shown) can be substituted obviously for the relay 14. In the alarm circuit 10 all of the dpdt relays and the thermal relays are illustrated in their deenergized condition, at which time the alarm circuit 10 is armed, assuming that the master switch 16 is closed. In particular at this time the thermal relays 20, 22 are ungrounded (i.e. their delay actuating means are de-energized) and the dpdt relays 12–18 are in their "up" positions (as viewed in FIG. 1), i.e., their normally closed contacts $a$ and $b$ are bridged.

If desired the master switch 26 can be eliminated and the conductors 36, 38 direct-connected so that the alarm circuit 10 is perpetually coupled to the vehicle electrical circuit. This, of course, precludes non-use of the alarm circuit 10 in a specific application.

At this point it will be observed that the siren 28 or other alarm device and its "hot" terminal 30 are connected directly to the vehicle battery 24 or other potential source, in the armed condition of the alarm circuit 10, as illustrated in FIG. 1. such connection proceeds through conductor 32 and contact $a$ of relay 16, conductors 34, 35 and contact $b$ of relay 12, master switch 26 and conductors 36, 38. In this armed condition of the alarm circuit 10 the siren 28 is energized upon grounding of its negative terminal 40 through conductor 42, by closure of any one of parallel-connected alarm switches denoted generally by reference numeral 44 and forming part of a first sensing circuit 45. The normally closed alarm switches 44, which may number more or less than the three illustrated can be associated respectively with access means of a vehicle such as its passenger door or doors, hood, trunk, vehicle windows, etc. Where the alarm circuit 10 is utilized for protection of a building or other stationary facility, the alarm switches 44 can be respectively coupled to access means of the facility such as its doors, windows, loading docks and other entrance or access means. It is noteworthy to add that there is no current-drain on the source 24 in the stand-by or armed condition of the alarm circuit 10.

The siren 28 is of a type that is conventionally available for burglar alarm systems. Its internal relay (not shown) is of the electically latching type. Therefore, in the event of unauthorized opening of the vehicle door, hood, trunk, or other access means associated with the alarm switches 44, the siren 28 would continue to sound, although the switch 44 is reopened by subsequent reclosure of the access means. In FIG. 2, where a horn or other alarm device not having an internal, electrically latchable relay is utilized, the function of such internal relay is provided by an additional relay 76 of the alarm circuit 11, as described below.

The term "access means" as used herein is intended to include any access arrangement for ingress or egress with respect to the motor vehicle or a stationary facility of any kind that can be or is desired to be protected by an alarm system. Although not limited thereto, examples of such ingress or egress arrangements are the doors, windows, tailgate, hood or trunk lid of a motor vehicle, or the doors, windows, fire escape, loading dock and the like of a building or other stationary facility. As further examples, the switches 44 or 44' can be positioned for closure upon unauthorized usage of telephones or other office equipment or they can be located in areas most likely to undergo an early temperature rise in the event of fire. Such areas and equipment and the like are also intended for inclusion by the term "access means."

In the case of a vehicle, however, it is to be noted that none of the alarm switches 44 is coupled to the driver's or operator's door. Instead a separate normally closed alarm switch 46, forming part of a second sensing circuit 47 is coupled to the driver's door (not shown) or in the case of a building or other stationary facility to the main entrance door thereof. The operation of the driver's door switch 46 and the second sensing circuit 47 will be described subsequently.

Considering that the alarm circuit 10 is always in an armed condition for energizing the siren 28 or other alarm means (as long as the master switch 26 is closed), it is highly advantageous to provide appropriate delay means for restraining the operation of the alarm signal during the time when occupants are leaving the vehicle and also during the time in which the driver or operator is entering the vehicle. This prevents the alarm circuit 10 from issuing false alarms or otherwise energizing the siren 28 or other alarm means at inappropriate times.

The exit delay arrangement incorporates the thermal relay 20 and associated components, while the entrance delay arrangement incorporates the thermal relay 22, and associated components as explained subsequently. When the occupant or occupants desire to leave the vehicle, disarm switch 48 is momentarily closed to cause the thermal relay 20 to conduct for a predetermined period ranging from about 5 to 45 seconds, depending upon the length of time that the disarm switch 48 is depressed. Desirably the disarm switch 48 is a normally open, push-button switch located under the dash or in the glove compartment or other conveniently accessible but inobvious area of the vehicle. As in the case of master switch 26, the disarm switch 48 can be a lock-switch.

When the thermal relay 20 is conductive a circuit is completed through conductors 50, 52 and relay contact $a$ of relay 12 to its coil $e$, causing the relay 12 to engage its normally open contacts $c$, $d$. Energization of the relay 12 immediately interrupts the circuit including the conductors 32, 34, 35 from the siren 28 to the vehicle battery 24 until the thermal relay 20 again becomes nonconductive and relay 12 resumes its normally closed condition as illustrated. The time during which the thermal relay 20 remains energized after momentary closure of the disarm switch 48 is adequate for complete evacuation of the vehicle or other facility protected by the alarm circuit 10. A pilot light 54, buzzer, or other warning device is coupled in parallel with energizing coil $e$ of the relay 12 to provide a warning that the relay circuit 10 is only momentarily disarmed. A diode $f$ desirably is connected across the energizing coil $e$ of each of the relays 12–18 to eliminate back emf and chattering.

The entry delay circuit incorporates the thermal relay 22, relays 16, 18 and associated components and is further arranged with the second sensing circuit 47 including the operator's door or main entrance switch 46. This arrangement provides an appropriate delay interval for the driver or other occupant to enter the driver's door of the vehicle or the main entrance of a building or other facility. After such entrance the occupant can disarm the alarm circuit 10 completely by opening master switch 26 or momentarily by depressing the disarm switch 48 as appropriate or as required to permit entry of additional occupants. In the case of a stationary facility it may be highly desirable to permit the alarm circuit 10 to remain in its armed condition, in which case the master switch 26 can be more appropriately provided in the form of a lock switch. For mnemonic purposes disarm switch 48, and also the master switch 26 if desired, can be provided as an additional switch position of the vehicle ignition switch.

With more particular reference to the entry delay arrangement it should be noted that proper operation of the alarm circuit 10 requires the driver's door to be opened first in order to prevent energization of the alarm device 28 by one of the alarm switches 44. Opening of the driver's door permits closure of alarm switch 46 (or activation of other suitable sensing means) which completes a circuit path from vehicle (and circuit) ground 56 to the grounding contact G of the thermal relay 22 through conductors 58, 60, 62 and relay contacts b, a, of relays 16, 18. This momentary application of potential to the thermal relay 22 energizes relay 16 through conductor 64 for a period of about 45 seconds until the thermal relay 22 again becomes nonconductive. At the same time relays 14 and 18 are energized through conductors 34, 35, relay 16, conductors 66, 68 and then electrically latched in their energized positions through conductors 34, 70, 71.

Energization of the relay 14 provides an alternate path to ground for the alarm device 28 through conductors 72, 74 and the electrically latched relay 14, which path bypasses the first sensing circuit 45 and individual sensing switches 44. However, the alarm means 28 cannot be energized until the thermal relay 22 again becomes nonconductive, after an interval of about 45 seconds, at which time, relay 16 becomes deenergized to recouple the alarm means 28 to the vehicle battery 24 through relays 12 and 14 and their normally closed contacts b and a respectively, and associated conductors. This interval affords adequate time for the authorized driver or other occupant of the vehicle to enter the vehicle from the driver's door and open the master switch 26 or momentarily close the disarm switch as appropriate, before the alarm device 28 is automatically activated by completion of a circuit thru electrically latched relay 14 and the deenergized relay 16.

In the event that a nonauthorized person enters the driver's door either by picking the lock or otherwise breaking and entering, the alarm means 28 will be energized when the thermal relay 22 becomes nonconductive, as the nonauthorized person will be unaware of the location of the disarm switch 48 or the master switch 26. If these switches are key-operated, the nonauthorized person will not have adequate time to pick or otherwise tamper with their locks, in the event he is able to locate them.

Of course, if the unauthorized person attempts to enter the vehicle by some other avenue such as a passenger door, the trunk or the hood, the alarm means 28 is energized through its other grounding path including conductor 42 and one of the first sensing switches 44.

As noted above, opening of the driver's door and closure of its sensing switch 46 causes relays 14 and 18 to become electrically latched in their energized conditions. Thereafter, reclosure of the driver's door by the unauthorized person cannot prevent sounding of the alarm means 28, as the electrical latchment of the relay 18 effectively removes the driver's door switch 46 from the circuit. Desirably the thermal relay 22 is provided with as short a time delay as practical for entrance of the vehicle driver or other authorized person, for example as little as 15 seconds, to minimize any possibility of an unauthorized person breaking and entering via the driver's door or other portal protected by the alarm circuit 10 and switch 46, for locating master switch 26 or disarm switch 48, picking the lock thereon if any, cutting a conductor, or otherwise tampering with the alarm circuit 10. The actual time delay required will vary with the type and make of vehicle, and such delay can be varied within limits by adjusting the value of resistance 67. The period of conductivity of the thermal relay 22 is thus dependent upon the cumulative effects of a momentary current surge along conductors 58, 60, 62 (prior to switching of relays 16, 18 to their normally open contacts) and thereafter a residual grounding current through by-passing resistance 67.

Alarm circuit 11 of FIG. 2, wherein similar components are identified by similar reference numerals with primed accents, functions in a similar manner but incorporates an additional relay 76 and associated components described below. When the alarm circuit 11 is tripped, vehicle horn 78 is activated by energization of the conventionally provided vheicle horn relay 80 through conductor 82 and contact c of relay 76, when the latter is energized. The alarm circuit conductor 82 thus bypasses the conventional vehicle horn switch 84.

As in the case of relays 14, 14', relay 76 is illustrated as a dpdt switch for purposes of minimizing inventory and manufacturing complexities, although the relay 76 functions as a dpst switch. If desired, however, a dpst relay can be physically substituted. In a manner similar to that of alarm circuit 10 of FIG. 1, the alarm circuit 11 of FIG. 2 is fully armed when master switch 26' is closed and all of relays 12'–18' and 76 are deenergized to engage their normally closed a,b contacts as shown. At that time closure of any one of the parallel-connected alarm or sensing switches 44' energizes coil e of relay 76 through conductors 86, 88, 90, contact a of relay 16' and conductors 35', 34', relay 12', the closed master switch 26' and associated circuit components. At the same time, the energization of relay 76 bypasses the normal vehicle horn switch 84 to provide an alternate grounding path for horn relay coil 92 through conductors 82, 94 and contact c of relay 76. Once the alarm circuit 11 is tripped by energization of relay 76, the latter is electrically latched through conductor 88 such that re-opening of the aforementioned alarm switch or switches 44' cannot terminate the alarm. Instead the vehicle horn 78 will blow until master switch 26' is opened.

In other respects the alarm circuit 11 functions in much the same manner as alarm circuit 10 of FIG. 1. For example when authorized occupants of the vehicle desire to leave, the alarm circuit 11 can be disarmed for a predetermined period by momentarily closing the disarm switch 48'. By the same token, energization of the vehicle horn 78 is automatically delayed for alarm purposes, when the driver's door sensing switch 46' is actuated, through operation of relays 14', 16', 18' as described in connection with related components of FIG. 1.

As pointed out in connection with the alarm circuit 10 of FIG. 1, the alarm circuit 11 can be used with a stationary facility by coupling the alarm switches 44' respectively with doors and windows and other access means thereof, and by coupling the main door sensing switch 46' with a main or other given entrance of the facility.

From the foregoing it will be seen that novel and efficient alarm systems have been disclosed herein, The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. An alarm system for indicating unauthorized use or entry of a facility protected thereby, said facility having access means and a source of electric potential, said alarm system comprising an alarm device, first switching means including a circuit path coupled between said source and said alarm device, second switching means having a normally conductive first circuit path coupled between said source and said alarm device for supplying an energizing potential to said alarm device for arming said alarm system, a time delay circuit including delay actuating means, sensing means sensitive to opening of said access means, a normally conductive second circuit path through said second switching means and a normally conductive circuit path through third switching means connected in series between said delay actuating means and said sensing means, said time delay circuit when actuated energizing said second switching means to interrupt said second switching means first path for temporarily disarming said alarm device during an actuated interval of said time delay circuit for a predetermined delay period.

2. The combination according to claim 1 wherein said facility is a vehicle and said alarm device includes a horn of said vehicle, said sensing means include a plurality of normally closed switches coupled to doors and windows of said vehicle.

3. The combination according to claim 2 wherein additional ones of said normally closed switches are coupled respectively to hood and trunk doors of said vehicle.

4. The combination according to claim 1 including a normally nonconductive third circuit path forming part of said second switching means and energizable by said delay circuit to a conductive condition during a conductive period of said time delay circuit to energize said third switching means to interrupt said third switching means circuit path for controlling the delay actuating means of said time delay circuit.

5. The combination according to claim 1 wherein said first switching means includes a normally open but electrically latchable by-passing second circuit path for energizing said alarm device in the event of reclosing of said access means.

6. The combination according to claim 5 wherein said third switching means includes an additional circuit path sensitive to the actuation of said third switching means for electrically latching said third switching means and said first switching means by-passing second path.

7. The combination according to claim 1 including fourth switching means having a normally conductive circuit path connecting said potential source to said first-mentioned time delay circuit and to said second switching means, and a second time delay circuit coupled to said fourth switching means to energize said fourth switching means to open said fourth switching means circuit path for delaying actuation of said alarm device for a second predetermined delay period.

8. The combination according to claim 7 wherein said second time delay circuit includes variable delay actuating means variably actuatable for variably closing a normally open circuit path through said delay circuit, and means for variably energizing said second time delay actuating means.

9. The combination according to claim 8 wherein said second time delay circuit is a thermal relay, and said variably energizing means include a normally open manually operable switch coupled between a grounding circuit of said thermal relay and a system ground.

10. The combination according to claim 7 including a warning indicator coupled to said second delay circuit and to said alarm system for energization thereby but only during the energization of said fourth switching means by said second time delay circuit.

11. The combination according to claim 1 wherein said time delay circuit is a thermal relay including a grounding circuit, and resistance means are coupled between said grounding circuit and a system ground of said alarm system, said resistance means being selected to produce said predetermined delay period in said time delay circuit.

12. An alarm system for indicating unauthorized use or entry of a facility protected thereby, said facility having access means and a source of electric potential, said alarm system comprising an alarm device, first switching means having a circuit path the conductivity of which is sensitive to opening of said access means, second switching means having a normally conductive circuit path coupled between said alarm device and said potential source, third switching means having a normally conductive circuit path in series with said second switching means path, and a time delay circuit coupled to said third switching means to energize said third switching means to open said third switching means path for delaying actuation of said alarm device for a predetermined period, said time delay circuit including variable delay actuating means variably actuatable for variably closing a normally open circuit path through said delay circuit, and means for variably and manually energizing said time delay actuating means.

13. The combination according to claim 12 wherein said time delay circuit is a thermal relay, and said variable energizing means include a normally open manually operable switch coupled between a grounding circuit of said thermal relay and a system ground of said alarm system.

14. The combination according to claim 1 including additional sensing means in said first switching means, said additional sensing means being sensitive to opening of at least one of additional access means.

* * * * *